(12) United States Patent
Fell et al.

(10) Patent No.: US 10,965,105 B2
(45) Date of Patent: Mar. 30, 2021

(54) PARTITION COVERS FOR ELECTRIC DISTRIBUTION EQUIPMENT ENCLOSURES

(71) Applicant: Consolidated Edison Company of New York, Inc., New York, NY (US)

(72) Inventors: Eric M. Fell, Cortlandt, NY (US); Matthew Patrick Johnson, West Milford, NJ (US); Jozsef Szabo, Montgomery, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 21 days.

(21) Appl. No.: 16/295,814

(22) Filed: Mar. 7, 2019

(65) Prior Publication Data
US 2020/0287361 A1    Sep. 10, 2020

(51) Int. Cl.
| | |
|---|---|
| *H02B 11/12* | (2006.01) |
| *H02B 11/127* | (2006.01) |
| *H02B 11/24* | (2006.01) |
| *H02B 1/052* | (2006.01) |
| *H02B 1/06* | (2006.01) |
| *H02B 13/025* | (2006.01) |

(52) U.S. Cl.
CPC ........ *H02B 11/127* (2013.01); *H02B 1/0523* (2013.01); *H02B 1/066* (2013.01); *H02B 11/24* (2013.01); *H02B 13/025* (2013.01)

(58) Field of Classification Search
CPC .... H02B 11/127; H02B 1/0523; H02B 1/066; H02B 11/24; H02B 1/14; H02B 1/013; H02G 5/08

USPC ............... 200/50.24; 220/703; 455/575.4
See application file for complete search history.

(56) References Cited

U.S. PATENT DOCUMENTS

| | | | |
|---|---|---|---|
| 3,920,939 | A | 11/1975 | Ciboldi et al. |
| 4,002,864 | A | 1/1977 | Kuhn et al. |
| 5,452,810 | A | 9/1995 | Schwartz |
| 5,483,416 | A | 1/1996 | Goe, Jr. |
| 7,518,851 | B2 | 4/2009 | Tsuchiya et al. |
| 9,166,384 | B2 | 10/2015 | Kobayashi et al. |
| 2003/0116413 | A1* | 6/2003 | Narusevicius ........... H02B 1/28 200/50.21 |

FOREIGN PATENT DOCUMENTS

| | | | | |
|---|---|---|---|---|
| JP | 2016171668 A | | 9/2016 | |
| KR | 101307197 | * | 10/2011 | ............. H02B 1/015 |

* cited by examiner

*Primary Examiner* — Edwin A. Leon
*Assistant Examiner* — Iman Malakooti
(74) *Attorney, Agent, or Firm* — Cantor Colburn LLP

(57) ABSTRACT

A partition cover for a switchgear enclosure includes a main cover with a lip arranged along a first edge of the partition cover, a sliding cover with a second lip arranged along a second edge of the sliding cover, and a locking mechanism. The sliding cover is slidably supported on the main cover. The locking mechanism is fixed to the main cover and operably connected to the sliding cover, the locking mechanism is arranged to lock position of the sliding cover relative to the main cover to fix the partition cover within an interior of a switchgear enclosure. Switchgear enclosures and methods of emplacing and removing partition covers from within switchgear enclosures are also described.

20 Claims, 8 Drawing Sheets

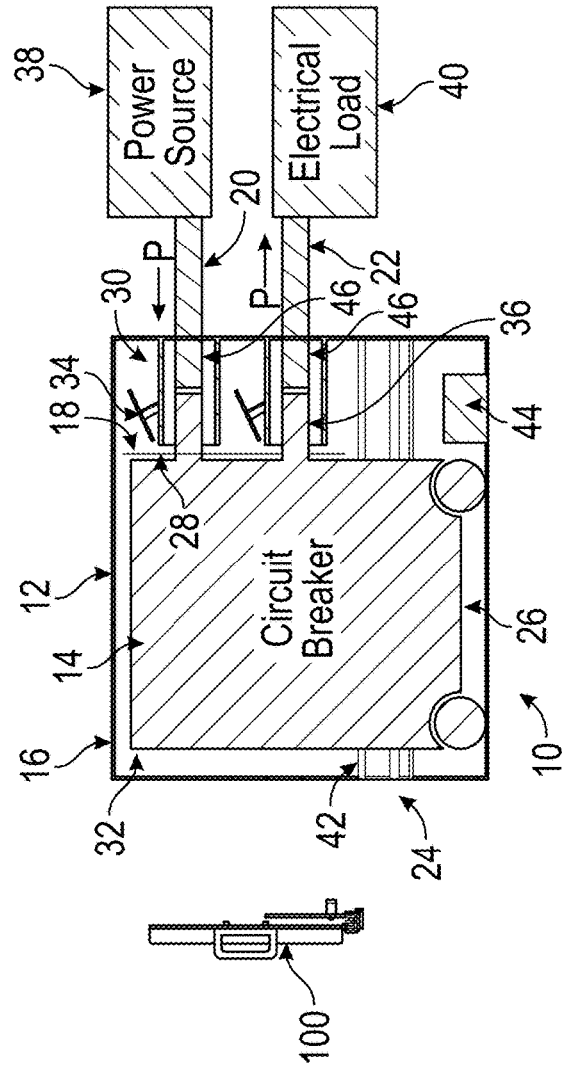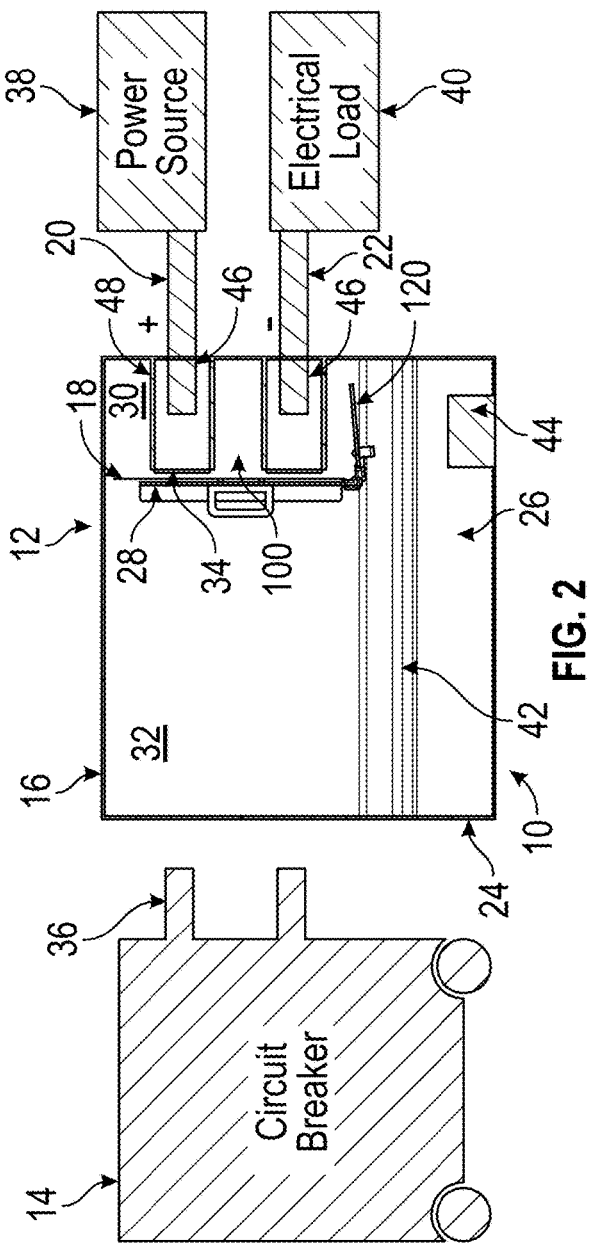

PARTITION COVERS FOR ELECTRIC DISTRIBUTION EQUIPMENT ENCLOSURES

BACKGROUND

The present disclosure relates generally to switchgear safety equipment, and more particularly to partition covers and methods of emplacing and removing partition covers from within switchgear enclosures to isolate workspaces from energized equipment during switchgear maintenance events.

Electrical power distribution systems commonly employ switchgear to control the flow of electrical power between power sources and various electrical devices connected to the switchgear. In low and medium voltage applications switchgear generally employ a removable circuit breaker housed in a cubicle. The cubicle houses a supply bus and a feeder bus which are interconnected with one another by the circuit breaker when it is closed. Typically, the circuit breaker is disengaged from the feeder bus and the supply bus for cubicle maintenance in a racking-out type process and then removed from the cubical such that maintainers can access the interior of the switchgear cubicle to perform maintenance. Once the maintenance event is complete the circuit breaker is returned to the enclosure and engaged to the supply bus and the feeder bus through a racking-in type process.

Since switchgear maintenance generally includes work in close proximity to structures that carry significant voltages and loads (current), various types of safety equipment have been developed. For example, remote racking devices are known which allow the circuit breaker to be disengaged and engaged from both the supply and feeder bus with the maintainer remote from the circuit breaker. Closures can also be employed to separate portions of the cubicle interior requiring maintenance to reduce the risk of inadvertent contact of energized components and/or damage of cubical components during maintenance events. However, it is generally accepted that certain types of cubicle maintenance require that the switchgear cubicle be de-energized, typically with a bus section outage, to limit risk of incidental contact with energized components that can result in arc flash injury and even electrocution during cubicle maintenance events. Since bus section outages can pose significant cost and disruption to the customers connected to the bus that is subject to the outage, maintenance events requiring bus section outages are commonly delayed, deferred or de-prioritized due to competing maintenance needs and unscheduled events that consume outage budgets—reducing the reliability of the switchgear otherwise in need of maintenance.

For at least the foregoing reasons there remains a need in the art for improved partition covers for switchgear enclosures, switchgear enclosures mounting such partition covers, and methods of fixing partition covers within switchgear enclosures. The present disclosure provides a solution for this need.

BRIEF SUMMARY

According to one embodiment, a partition cover for a switchgear enclosure is provided. The partition cover includes a main cover with a first lip arranged along a first edge of the partition cover, and a locking mechanism. The sliding cover is slidably supported on the main cover. The locking is mechanism fixed to the sliding cover and is operably associated with the sliding cover to lock position of the sliding cover relative to the main cover to fix the partition cover within an interior of a switchgear enclosure.

In addition to one or more of the features described above, or as an alternative, further embodiments may include a first handle fixed to the main cover adjacent to the first lip and a second handle fixed to the main cover and longitudinally offset from the first handle, the first handle arranged longitudinally between the second handle and the first lip.

In addition to one or more of the features described above, or as an alternative, further embodiments may include a first guide fixed to the main cover and longitudinally offset from the first lip and a second guide fixed the main cover and laterally offset from the first guide, the sliding cover slidably receiving both the first guide and the second guide to limit movement of the sliding cover to a plane substantially parallel with the main cover.

In addition to one or more of the features described above, or as an alternative, further embodiments may include that the partition cover and the sliding cover include a transparent and an electrically insulative material.

In addition to one or more of the features described above, or as an alternative, further embodiments may include that the main cover has an alignment mark corresponding to a feeder tube aperture array of a partition of the switchgear enclosure.

In addition to one or more of the features described above, or as an alternative, further embodiments may include a first guide slot extending through the sliding cover and substantially orthogonal to the second lip to receive a first guide fixed to the main cover and a second guide slot extending through the sliding cover and substantially parallel to the first guide slot to receive a second guide fixed to the main cover.

In addition to one or more of the features described above, or as an alternative, further embodiments may include that the locking mechanism comprises a metal rail fixed relative to the main cover and overlapping the sliding cover.

In addition to one or more of the features described above, or as an alternative, further embodiments may include that the locking mechanism further includes a housing fixed to the sliding cover and having a grip portion extending therefrom, the housing arranged between the metal rail and the sliding cover; a tensioning handle pivotably fixed to the housing and movable in a tensioning stroke substantially parallel to the sliding cover; and a release handle pivotably fixed to the grip and movable in a release stroke substantially parallel to the sliding cover.

In addition to one or more of the features described above, or as an alternative, further embodiments may include that the locking mechanism further includes a tensioning plate stack seated on the metal rail and operably associated with the sliding cover and a locking plate stack seated on the metal rail and operably associated with the sliding cover, the locking plate stack arranged between the second lip and the tensioning plate stack.

In addition to one or more of the features described above, or as an alternative, further embodiments may include a lower baffle pivotably fixed to a longitudinal edge of the main cover, the lower baffle movable between a folded position, wherein the lower baffle is substantially parallel relative to the main cover, and a deployed position, wherein the lower baffle is substantially orthogonal relative to the main cover.

In addition to one or more of the features described above, or as an alternative, further embodiments may include a resilient member coupling the lower baffle to the main cover, an aperture-facing retainer overlapping the resilient member and the main cover, and a partition-facing retainer overlapping the resilient member and the lower baffle, the lower baffle being formed from a transparent and electrically insulative material, and the resilient member being formed from an opaque and electrically insulative material.

In addition to one or more of the features described above, or as an alternative, further embodiments may include a lower baffle handle fixed to the lower baffle, the lower baffle handle disposed on a side of the main cover opposite the first lip when the lower baffle in the folded position.

According to another embodiment a switchgear enclosure is provided. The switchgear enclosure includes an enclosure with an interior, a partition defining a feeder tube aperture array and separating the interior of the enclosure into a breaker cell and a bus cell, a supply bus, and a feeder bus. The supply bus is arranged within the bus cell and in communication with a first of the feeder tube apertures. The feeder bus is arranged within the bus cell and in communication with a second of the feeder tube apertures. A partition cover as described above is seated within the enclosure, the partition cover disposed within the breaker cell and separating the breaker cell from the supply bus and the feeder bus.

In addition to one or more of the features described above, or as an alternative, further embodiments may include a shutter mechanism arranged within the bus cell for separating the breaker cell from the supply bus and the feeder bus.

In addition to one or more of the features described above, or as an alternative, further embodiments may include a first handle fixed to the main cover at a location and a second handle fixed to the main cover and longitudinally offset from the first handle such that the first handle is between second handle and the first lip. A first guide is fixed to the main cover and offset from the second handle and a second guide is fixed the main cover and offset from the second handle on a side of the main cover opposite the first guide, the sliding cover slidably receiving both the first guide and the second guide to limit movement of the sliding cover to a sliding cover movement plane substantially parallel with the main cover.

In addition to one or more of the features described above, or as an alternative, further embodiments may include that the locking mechanism includes a metal rail fixed to the main cover and overlapping the sliding cover ad partition cover includes a lower baffle pivotably fixed to a longitudinal edge of the main cover, the lower baffle movable between a folded position, wherein the lower baffle is substantially parallel relative to the main cover, and a deployed position, wherein the lower baffle is substantially orthogonal relative to the main cover.

In addition to one or more of the features described above, or as an alternative, further embodiments may include that the partition cover and the sliding cover comprise a transparent and an electrically insulative material, and that the main cover comprises an alignment mark corresponding to the feeder tube aperture array.

In a further embodiment a method of emplacing a partition cover in a switchgear enclosure is provided. The method includes seating a main body of the partition cover abuts a partition such that a first lip arranged along a first edge of the partition cover engages the enclosure; displacing a sliding cover supported on the main cover relative to the main cover, the sliding cover having a second lip arranged along a second edge of the partition cover; and locking the sliding cover relative to the main cover with a locking mechanism fixed to the main cover and operably connected to the sliding cover, whereby the position of the sliding cover is locked relative to the main cover.

In addition to one or more of the features described above, or as an alternative, further embodiments may include aligning the partition cover to a feeder tube aperture array defined by the partition by registering two or more alignment marks corresponding to feeder tube apertures of the feeder tube aperture array and arranged on the main cover.

In addition to one or more of the features described above, or as an alternative, further embodiments may include pivoting a lower baffle pivotably fixed to a longitudinal edge of the main cover between a folded position, wherein the lower baffle is substantially parallel to the main cover, and a deployed position, wherein the lower baffle is substantially orthogonal relative to the main cover; and advancing the partition cover into the enclosure such that the partition overlaps the lower baffle and the lower baffle is disposed at least partially within a bus cell of the switchgear enclosure.

Technical effects of embodiments of the present disclosure include the capability to establish an isolation plane with the switchgear enclosure that separates the user work envelope from energized structures within the switchgear enclosure. In certain embodiments the isolation plane is retained irrespective of the position of the safety shutter typically provided within switchgear enclosures for isolation, allowing the shutter mechanism to be operated, inspected and serviced while the structures within the switchgear enclosure remain energized. In accordance with certain embodiments the partition covers described herein provide isolation between the energized structures within the switchgear enclosure and the lower recesses of the switchgear enclosure bus cell, allowing inspection and service of structures generally requiring de-energization of the switchgear enclosure.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIGS. 1 and 2 are schematic views of a switchgear assembly including a cover partition constructed in accordance with the present disclosure, showing a circuit breaker racked-in a switchgear enclosure with the cover partition positioned for emplacement and the circuit breaker racked-out of the switchgear enclosure with the cover partition emplaced within the switchgear enclosure, respectively;

DETAILED DESCRIPTION

Figure 3:
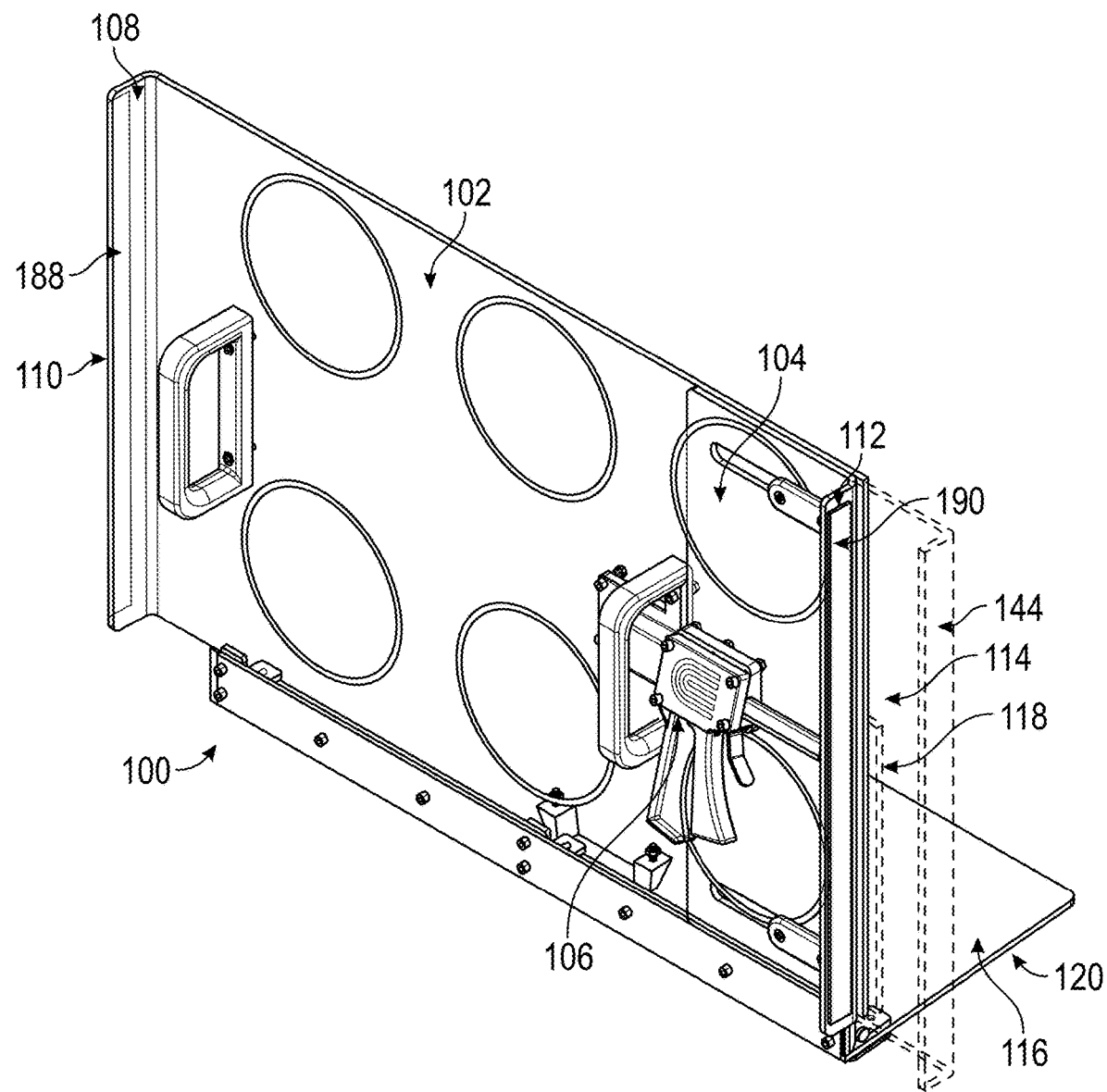
FIG. 3 is a perspective view of the partition cover of FIG. 1 according to an embodiment, showing a main cover with a sliding cover and the lower baffle fixed to the main cover.

A detailed description of one or more embodiments of the disclosed apparatus and method are presented herein by way of exemplification and not limitation with reference to the Figures.

Reference will now be made to the drawings wherein like reference numerals identify similar structural features or aspects of the subject disclosure. For purposes of explanation and illustration, and not limitation, a partial view of an exemplary embodiment of a partition cover for a switchgear enclosure is shown in FIG. 1 and is designated generally by reference character 100. Other embodiments of partition covers, switchgear enclosures having partition covers, and methods of emplacing partition covers within switchgear enclosures in accordance with the present disclosure, or aspects thereof, are provided in FIGS. 2-10E, as will be described. The systems and methods described herein can be used to provide isolation within switchgear enclosures during maintenance events, such as when isolation is required due to the need to service a switchgear enclosure while structures within the enclosure are energized in low and medium voltage switchgear, though the present disclosure is not limited to low and medium voltage switchgear or to maintenance events entailing work around energized structures generally.

Referring to FIG. 1, a switchgear assembly 10 is shown. The switchgear assembly 10 includes a switchgear enclosure 12 and a circuit breaker 14. The switchgear enclosure 12 includes a housing 16, a partition 18, a supply bus 20, and a feeder bus 22. The housing 16 has a service aperture 24 that is in communication with an interior 26 of the housing 16 for servicing structures located within the housing 16 as well as for emplacing and removing the circuit breaker 14. The partition 18 defines a feeder tube aperture array 28, is arranged within the interior 26 of the housing 16, and separates a bus cell 30 from a breaker cell 32. The supply bus 20 and the feeder bus 22 are arranged within the bus cell 30 and are each in communication with the breaker cell 32 through the feeder tube aperture array 28. Communication between the supply bus 20 and the feeder bus 22 is controlled by a shutter mechanism 34, which is located in the breaker cell 32, and which opens and closes according to the position of the circuit breaker 14. When closed the shutter mechanism 34 separates the supply bus 20 and feeder bus 22 from the breaker cell 32. When open the shutter mechanism 34 allows typically electrical communication between the supply bus 20 and the feeder bus 22 and the breaker cell 32.

It is contemplated that the switchgear assembly 10 be a low or medium voltage switchgear assembly, e.g., rated for voltages between 480 volts to 35 kilovolts.

The circuit breaker 14 is configured and adapted for engagement with the supply bus 20 and the feeder bus 22. In this respect, when racked-in (shown in FIG. 1), stabs 36 carried by the circuit breaker 14 extend through apertures of the feeder tube aperture array 28 and connect the supply bus 20 with the feeder bus 22. The partition cover 100 is shown outside the switchgear assembly 10, the partition cover 100 available for emplacement into the switchgear enclosure 12 when the circuit breaker 14 is removed from the switchgear enclosure 12. As will be appreciated by those of skill in the art in view of the present disclosure, racking-in the circuit breaker 14 connects a power source 38 to the electrical load through the circuit breaker 14 via the supply bus 20 and the feeder bus 22. As will also be appreciated by those of skill in the art in view of the present disclosure, racking-in the circuit breaker 14 entails opening the shutter mechanism 34 to allow the stabs 36 of the circuit breaker 14 to mechanically engage the supply bus 20 and the feeder bus 22.

With reference to FIG. 2, when racked-out the circuit breaker 14 is disengaged from the supply bus 20 and the feeder bus 22, the electrical load 40 thereby being disconnected from the power source 38. Racking-in and racking-out is accomplished by a racking mechanism 42, which is located in the breaker cell 32 and which cooperates with the shutter mechanism 34 according to movement of the circuit breaker 14 during racking-in and racking-out operations. In certain embodiments the switchgear enclosure 12 houses a single circuit breaker 14. In accordance with certain embodiments, the switchgear assembly 10 can be a 15 kilovolt (kV) switchgear assembly. Although switchgear assembly 10 is shown and described herein in the context of switchgear assemblies with ratings between 5 kV and 15 kV, it is to be understood and appreciated that the present disclosure can benefit other types of switchgear, such as switchgear having ratings below 5 kV and/or above 15 kV, as appropriate for a given application. Examples of switchgear assembles that can benefit from the present disclosure include low and medium voltage switchgear assemblies, such as those marketed under the PowlVac® tradename by Powell Industries of Houston.

As will be appreciated by those of skill in the art in view of the present disclosure, switchgear such as switchgear assembly 10 can periodically require service. For example, it can be necessary to clean the interior 26 of the switchgear enclosure 12 at certain intervals during the service life of the switchgear assembly 10. It can also be necessary to inspect various structures located within the switchgear enclosure 12, such as the feeder tubes 48, the supply bus 20, and/or the feeder bus 22. Further, it can be necessary to service and/or repair mechanisms located within the switchgear enclosure 12—such as the shutter mechanism 34, the racking mechanism 42, and/or the circuit breaker 14. Service is typically accomplished during scheduled maintenance and/or unscheduled events during which the circuit breaker 14 is racked-out and physically removed from the switchgear enclosure, the interior 26 of the switchgear enclosure 12 thereby being accessible to users, e.g., maintainers, through the service aperture 24.

As will also be appreciated by those of skill in the art in view of the present disclosure, work by users around energized structures within the interior 26 of the switchgear enclosure 12 such as the supply bus 20 and the feeder bus 22 can expose the users to the risk of incidental contact with energized structures resulting in arc flash, injury or even electrocution. The risk associated with a given task is generally commensurate with proximity that a user can expect to come in to energized structures within the switchgear enclosure 12 and the degree of isolation present between the user and the energized structures. For example, the shutters of the shutter mechanism 34 typically provide isolation between the breaker cell 32 and the supply bus 20 and feeder bus 22. However, when the shutters of the shutter mechanism 34 are open, such as for visual inspection of the supply bus 20, the feeder bus 22, and/or the feeder tubes 48 as well as structures located in the lower recesses 44 of the bus cell 30, little (or no) isolation is generally available. For that reason, some maintenance events require de-energizing the switchgear enclosure 12 to limit the safety hazards associated with the events. This is generally done by de-energizing a bus section 46, typically by opening and racking-out an upstream circuit breaker providing connectivity to the supply bus 20. Such disconnections are generally referred to as bus section outages.

Bus section outages generally entail interruption of electrical service to customers, e.g., to the flow of electrical power P to the electrical load 40 otherwise supplied by the power source 38 through the circuit breaker 14. Since service interruptions can be costly and, in some instances, potentially dangerous to customers according to the nature of the electrical load 40 connected to the switchgear assembly 10, switchgear operators (like in utilities) typically ration bus section outages according to an outage budget and, when a particular bus section is taken out of service, carefully plan and manage the execution of the maintenance events scheduled for the outage. To limit (or eliminate entirely) the need for bus section outages during certain maintenance events and avoid significant increase of risk to users during work around energized structures in the switchgear enclosure 12, the switchgear assembly 10 includes the partition cover 100. The partition cover 100 is arranged to provide one or more isolation planes within in the interior 32 of the switchgear enclosure 12, thereby allowing a user to inspect and service structures within the switchgear enclosure 12 without de-energizing the supply bus 20 and/or the feeder bus 22 during certain maintenance events.

With reference to FIG. 3, the partition cover 100 is shown. The partition cover 100 includes a main cover 102, a sliding cover 104, and locking mechanism 106. The main cover 102 has a first lip 108 arranged along a first edge 110 of the partition cover 100. The sliding cover 104 also has a second lip 112 arranged along an opposite second edge 114 and is slidably supported on the main cover 102. The locking mechanism 106 is fixed to and operably associated with the sliding cover 104 to lock position of the sliding cover 104 relative to the main cover 102 and fix the partition cover 100 within the interior 26 (shown in FIG. 1) of the switchgear enclosure 12 (shown in FIG. 1). A first compression member 188 is fixed to the first lip 108 of the main cover 102 and a second compression member 190 is fixed to the second lip 112 of the sliding cover 104.

In the illustrated embodiment the partition cover 100 also includes an optional lower baffle 116. The lower baffle 116 is pivotably fixed to the main cover 102 and is moveable between a folded position 118 (shown in FIG. 3 in dashed outline), wherein the lower baffle 116 is substantially parallel to the main cover 102, and a deployed position 120 (shown in FIG. 3 in solid outline), wherein the lower baffle 116 is substantially orthogonal relative to the main cover 102.

Figure 4:
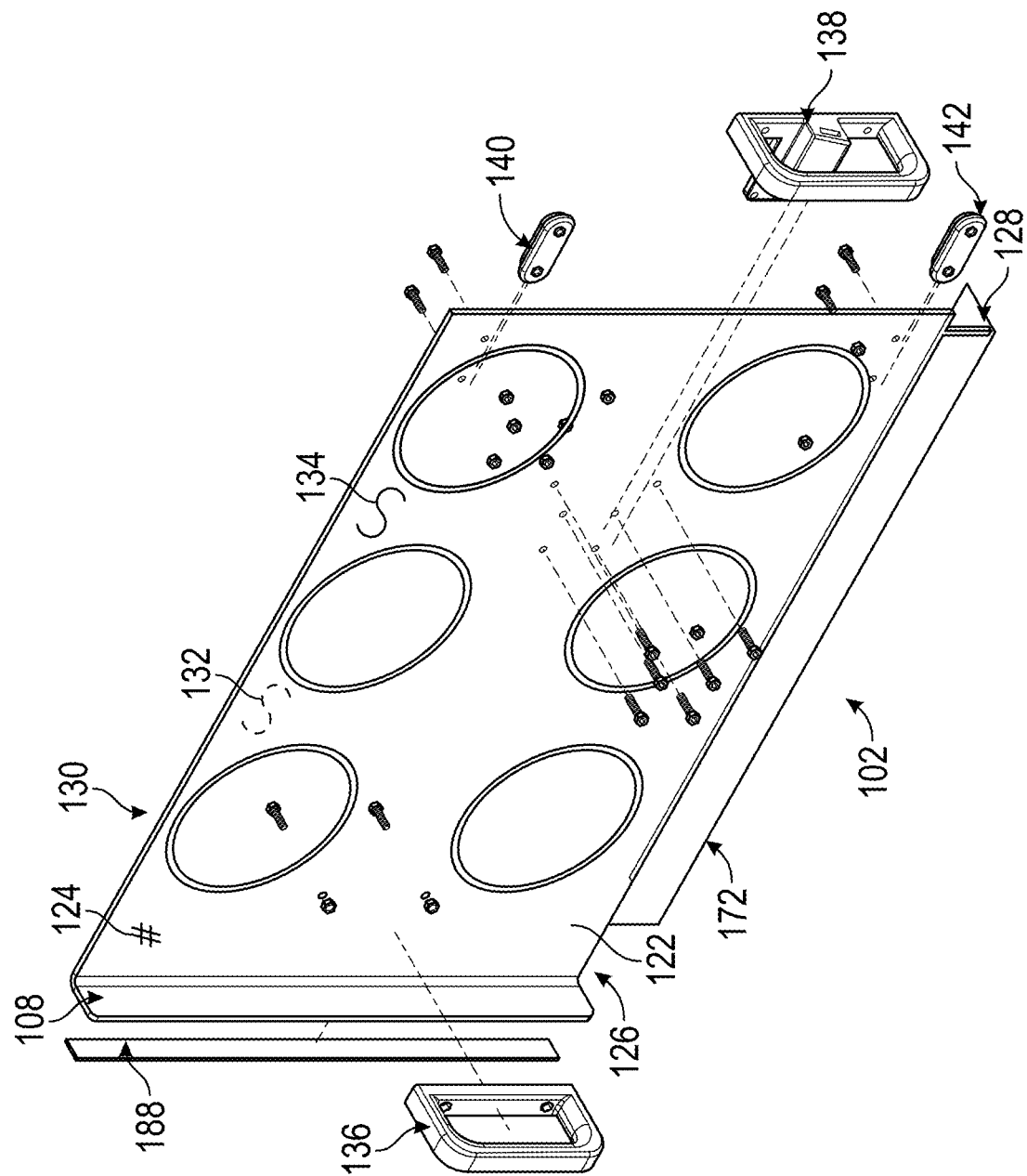
FIG. 4 is a partial exploded view of a main cover of the partition cover of FIG. 1 according to an embodiment, showing a first handle and second handle fixed to main cover and alignment marks arranged on the main cover.

With reference to FIG. 4, the main cover 102 is shown in an exploded view. The first compression member 188 is fixed to the first lip 108, for example with an adhesive, for compressive engagement between the main cover 102 and the interior of the switchgear enclosure 12 (shown in FIG. 1). The main cover 102 has a planar body 122 that is generally rectangular in shape and is formed from a transparent and electrically insulative material 124. Examples of suitable transparent materials include polycarbonates. Polycarbonate, e.g., on the order of about 0.25 inches (about 0.635 centimeters) in thickness, allows the main cover 102 to provide sufficient isolation when emplaced in front of the partition 18 (shown in FIG. 1) and be relatively lightweight, allowing a user to manually manipulate the cover within the interior 26 (shown in FIG. 1) of the switchgear enclosure 12 (shown in FIG. 1) during emplacement and removal of the partition cover 100 (shown in FIG. 1). In certain embodiments the main cover has a first racking mechanism notch 126 and a second racking mechanism notch 128, which are arranged to allow the partition cover 100 to fit within the switchgear enclosure 12 and be slidably supported on rails of the racking mechanism 42 (shown in FIG. 1), simplifying emplacement and removal of the partition cover 100.

An alignment mark 130 is arranged on the main cover 102. The alignment mark 130 corresponds to the feeder tube aperture array 28 (shown in FIG. 1) associated with the supply bus 20 and feeder bus 22 that is defined by the partition 18 (shown in FIG. 1) of the switchgear enclosure 12 (shown in FIG. 1). In certain embodiments the alignment mark 130 is arranged on an aperture-facing surface 132 of the main cover 102. In accordance with certain embodiments the alignment mark 130 can be arranged on a partition-facing surface 134 of the main cover 102. As shown in FIG. 4 the main body includes two or more alignment marks 130, e.g., six (6) alignment marks 130, corresponding to a feeder tube aperture array for a three-phase alternating current power circuit breaker assembly, e.g., the supply bus 20 and the feeder bus 22. Further, one or more alignment mark 130 may be circular, the alignment mark 130 extending circumferentially about respective feeder tube apertures of the feeder tube aperture array 28, allowing the partition cover 100 to be aligned within circuit breaker assemblies typically employed in low and medium voltage applications. As will be appreciated by those of skill in the art in view of the present disclosure, other types of alignment marks can be used and remain within the scope of the present disclosure.

A first handle 136 is fixed to the main cover at a location adjacent to the first lip 108. A second handle 138 is fixed to the main cover 102 and is longitudinally offset from the first handle 136 such that the first handle 136 is arranged between the second handle 138 and the first lip 108. The spacing between the first handle 136 and the second handle 138 is selected to allow a user to grasp both the first handle 136 and the second handle 138 when manipulating the partition cover 100 within the interior 26 (shown in FIG. 1) of the switchgear enclosure 12 (shown in FIG. 1), enabling the user to control movement of the partition cover 100 within the confines of the switchgear enclosure 12 (shown in FIG. 2). As shown in FIG. 4 the first handle 136 and the second handle 138 extend in the same direction from the main cover 102 as the first lip 108, i.e., from the aperture-facing surface 132, simplifying handling of the partition cover 100 within the confines of the switchgear enclosure 12 (shown in FIG. 1). It is contemplated that the first handle 136 and the second handle 138 each be constructed of a polymeric material which is electrically insulative. It is also contemplated that the first handle 136 and the second handle 138 be fastened to the main cover 102 with electrically insulative hardware, e.g., nylon nuts, bolts, washers, etc., thereby providing electrical isolation when the user is holding the partition cover 100 in proximity to energized structures within the switchgear enclosure 12.

A first guide 140 is fixed to the main cover 102 and is longitudinally offset from the first lip 108. A second guide 142 is fixed to the main cover 102 and is laterally offset from the first guide 140 such that the sliding cover 104 (shown in FIG. 2) slidably receives both the first guide 140 and the second guide 142, limiting movement of the sliding cover 104 to a sliding cover movement plane 144 (shown in FIG. 3) that is substantially parallel to the main cover 102. Limiting the movement of the sliding cover 104 to the sliding cover movement plane 144 in turn allows the partition cover 100 to be compressively seated within the switchgear enclosure 12 (shown in FIG. 1) and without bowing the main cover 102 when loaded in compression during seating with load required to seat the partition cover 100 within the switchgear enclosure 12. As illustrated in FIG. 3 the first guide 140 and the second guide 142 each extend in the same direction from the main cover 102 as the first lip 108, i.e., from the aperture-facing surface 132, allowing the partition-facing surface 134 of the main cover 102 to contiguously engage the partition 18. It is contemplated that the first guide 140 and the second guide 142 be constructed of a polymeric material which is electrically insulative. It is also contemplated that first guide 140 and the second guide 142 be fastened to the main cover 102 with electrically insulative hardware, e.g., e.g., nylon nuts, bolts, washers, etc., thereby providing electrical isolation when the user is holding the partition cover 100 in proximity to energized structures within the switchgear enclosure 12.

Figure 5:
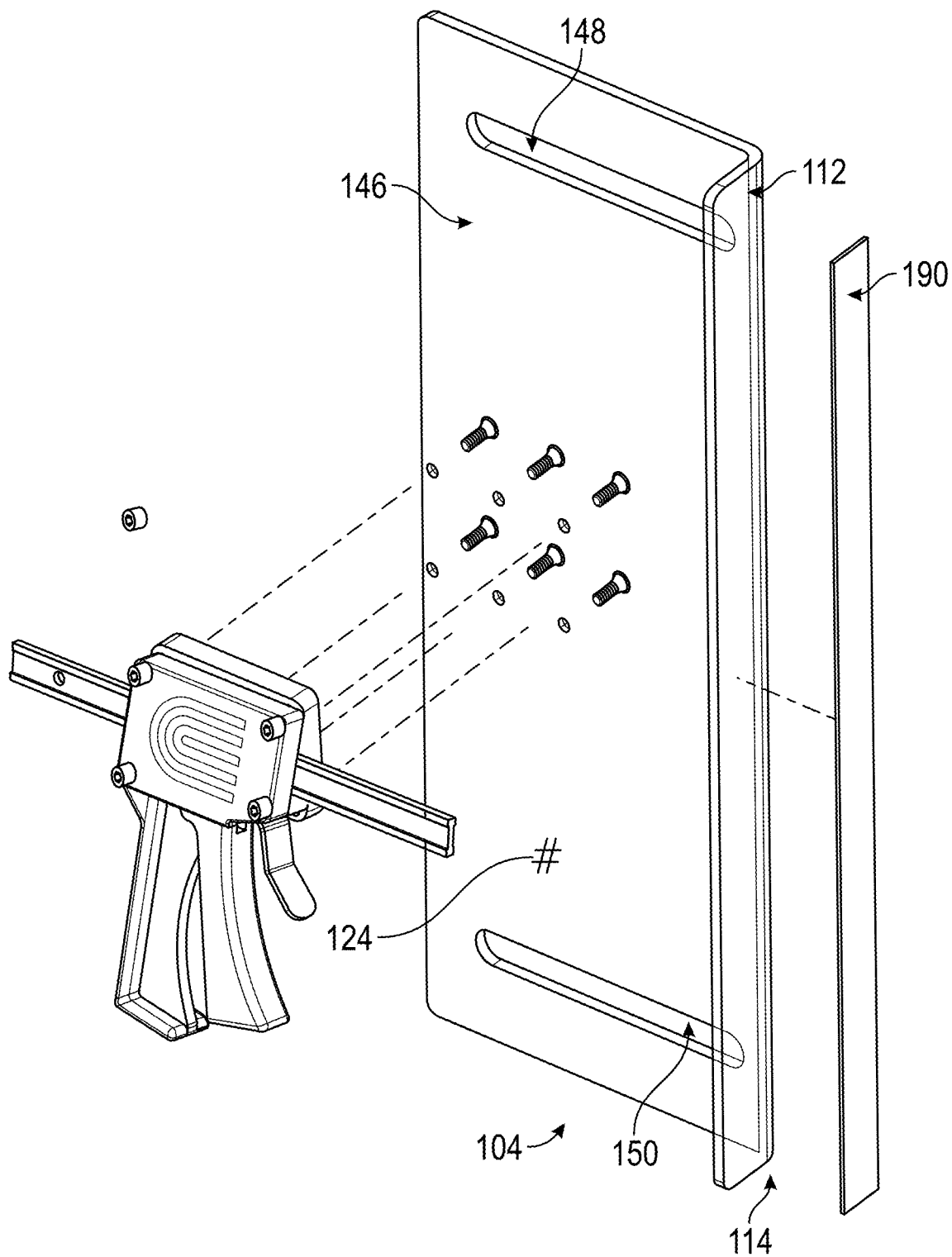
FIG. 5 is a partial exploded view of the sliding cover of the partition cover of FIG. 1 according to an embodiment, showing a first guide slot and a second guide slot extending through the sliding cover for slidable fixation of the sliding cover to the main cover.

With reference to FIG. 5, the sliding cover 104 is shown in an exploded view. The sliding cover includes a sliding cover body 146 with a generally rectangular shape and having the second lip 112 extending therefrom. The second lip 112 is located along (and defines) the second edge 114 of the partition cover 100 (shown in FIG. 1). The second compression member 190 is fixed to the second lip 112, for example with an adhesive, for compressive engagement between the main cover 102 and the interior of the switchgear enclosure 12 (shown in FIG. 1).

It is contemplated that the sliding cover 104 also be formed from the transparent and electrically insulative material 124, transparency allowing one or more alignment mark 130 (shown in FIG. 3) arranged on the main cover 102 (shown in FIG. 2) to be viewed in concert with apertures(s) of the feeder tube aperture array 28 (shown in FIG. 1) through the sliding cover 104. This in turn allows the partition cover 100 to be aligned to the feeder tube aperture array 28 during emplacement of the partition cover 100 within the interior 26 (shown in FIG. 1) of the switchgear enclosure 12 (shown in FIG. 1) as well as visually inspect structures located on the opposite side of the sliding cover 104.

A first guide slot 148 extends through the sliding cover 104, is orthogonal relative to the second lip 112, and receives the first guide 140 (shown in FIG. 3). This slidably fixes the sliding cover 104 to the main cover 102 (shown in FIG. 2). A second guide slot 150 extends through the sliding cover 104, is substantially parallel to the first guide slot 148, and receives the second guide 142. Receipt of the second guide 142 in the second guide slot 150 slidably fixes the sliding cover 104 to the main cover 102 such that the sliding cover 104 has only a single degree of freedom relative to the main cover 102 constraining movement of the sliding cover 104 to within the sliding cover movement plane 144. As will be appreciated by those of skill in the art in view of the present disclosure, receipt of the first guide 140 in the first guide slot 148 and the second guide 142 in the second guide slot 150 also renders the sliding cover 104 captive to the main cover 102, allowing the sliding cover 104 to be carried by the main cover 102 collectively for manipulation of the partition cover 100 (shown in FIG. 1) as a unitary structure. The unitary structure allows the partition cover 100 to be emplaced and/or removed from the switchgear enclosure 12 (shown in FIG. 1) as a singular assembly notwithstanding its construction from a plurality of detail parts.

Figure 6:
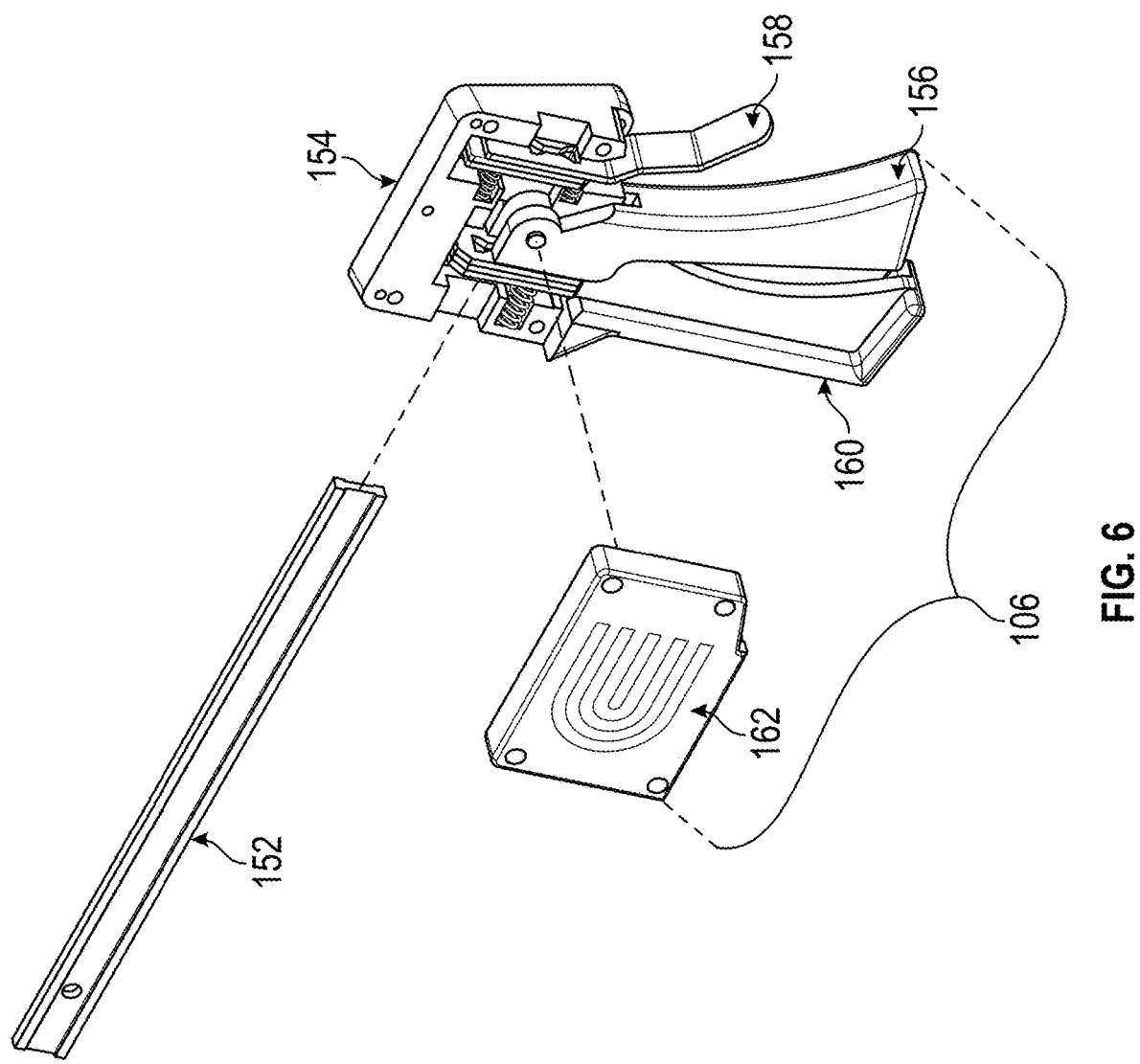
FIGS. 6 and 7 are partial exploded views of the locking mechanism of the partition cover of FIG. 1 according to an embodiment, showing housing with a grip portion and having a tensioning handle and a release handle pivotably fixed to the housing, respectively.
Figure 7:
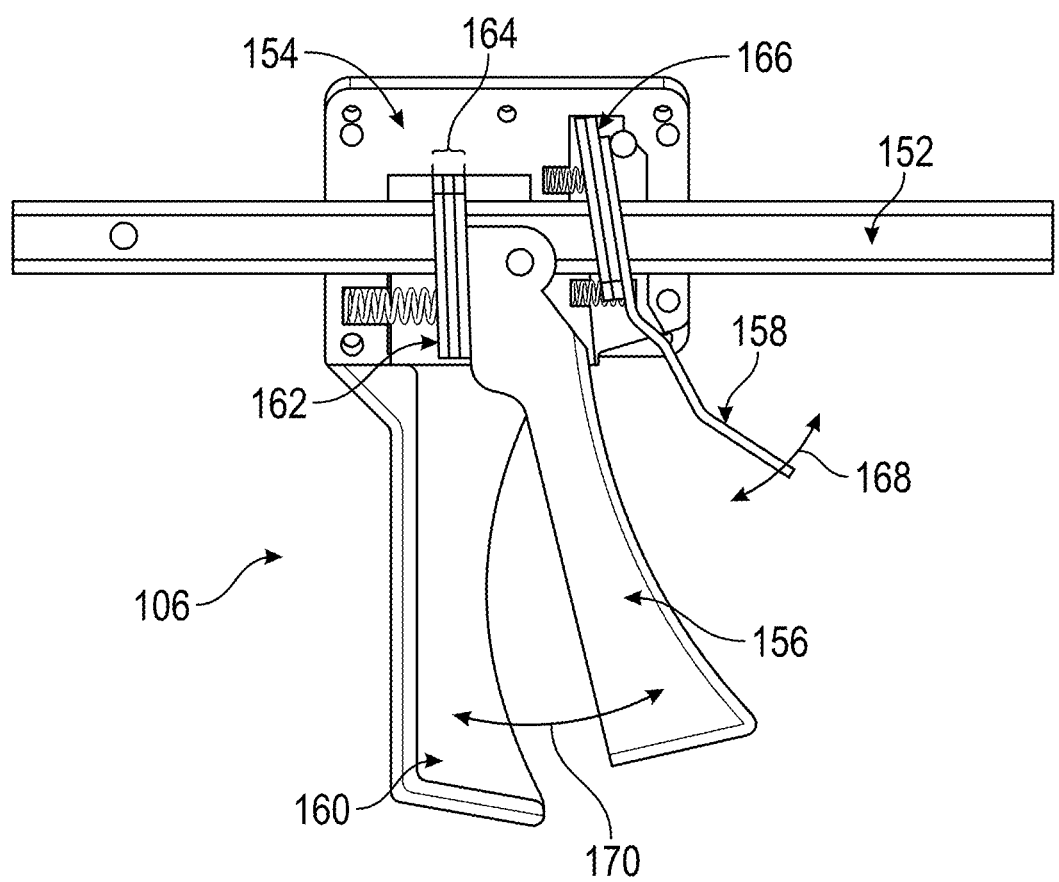

Referring to FIGS. 6 and 7, the locking mechanism 106 is shown. The locking mechanism 106 includes a metal rail 152 and a housing 154 with a grip portion 160. The locking mechanism 106 also includes a housing cover 162, a tensioning handle 156, and a release handle 158. On one end the metal rail 152 is fixed relative to the main cover 102 (shown in FIG. 3) and overlaps the sliding cover 104 (shown in FIG. 3) at a location on a side of the partition cover 100 opposite the partition 18 (shown in FIG. 1), the partition cover 100 thereby isolating the metal rail 152 from energized structures within the switchgear enclosure 12. The metal rail 152 is coupled to the main cover 102 by the second handle 138, the polymeric electrical insulative material forming the second handle 138 providing additional isolation between the metal rail 152 and the partition-facing surface 134 of the partition cover 100, further limiting the risk of incidental contact that can result in arc flash, injury or even electrocution. On an opposite end the metal rail 152 is slidably received within the housing 154 and the main cover 102. As will be appreciated by those of skill in the art in view of the present disclosure, the metal construction of the metal rail 152 has the advantage of providing strength to the metal rail 152. The metal construction of the metal rail 152 also allows the locking mechanism 106 to employ a plate-lever arrangement for displacing the sliding cover 104 relative to the main cover 102.

The grip portion 160 extends downward (relative to the top of FIG. 6) from the housing 154 and is longitudinally offset from the second handle 138 (shown in FIG. 4). More specifically, the grip portion 160 is offset from the second handle 138 by a distance that the user can readily shift from supporting the partition cover 100 (shown in FIG. 1) using the second handle 138 to supporting the partition cover 100 with the grip portion 160. The longitudinal offset is sized such that the user to support the partition cover 100 while displacing the sliding cover 104 relative to the main cover 102 prior to the sliding cover 104 engaging the interior of the switchgear enclosure 12 (shown in FIG. 1).

The housing cover 162 seats over the housing 154 and the metal rail 152, the housing cover 162 and housing 154 cooperatively enclosing a portion of the metal rail 152 within the locking mechanism 106. It is contemplated that the housing 154 and the housing cover 162 be formed from a polymeric material. It is also contemplated that housing 154 and the housing cover 162 be fastened to the main cover 102 with electrically insulative hardware, e.g., e.g., nylon nuts, bolts, washers, etc., thereby providing electrical isolation when the user is holding the partition cover 100 in proximity to energized structures within the switchgear enclosure 12.

As shown in FIG. 7, the tensioning handle 156 is pivotably fixed to the housing 154 and is arranged to load the partition cover 100 in compression. The compressive loading is accomplished by pivoting the tensioning handle 156 in a tensioning handle stroke 170. The tensioning handle stroke 170 is substantially parallel to the sliding cover 104 (shown in FIG. 3), which allows the user emplacing the partition cover 100 (shown in FIG. 1) within the switchgear enclosure 12 (shown in FIG. 1) to transfer the weight of the partition cover to the switchgear enclosure 12 smoothly and in a controlled manner, limiting (or eliminating entirely) the likelihood on an unexpected shift of the partition cover during fixation within the switchgear enclosure 12.

The tensioning handle 156 in turn is in communication with a tensioning plate stack 164 of the locking mechanism 106. The tensioning plate stack 164 is seated on the metal rail 152 and includes a plurality of metal plates each having a slot with a slot length that is greater that a height of the metal rail 152. The metal rail 152 in turn extends through the metal plate slots between a face of the tensioning handle 156 and a tensioning handle return spring located within a tensioning plate stack chamber, each of which are arranged within the housing 154.

When the tensioning handle 156 is driven through an initial tensioning handle stroke 170 the tensioning handle 156 displaces the tensioning plate stack 164 from its vertical orientation to an oblique orientation relative to the metal rail 152. This fixes the tensioning plate stack 164 to the metal rail 152 such that the remaining portion of the tensioning handle stroke 170 displaces the sliding cover 104 away from the main cover 102. When the tensioning handle 156 drives the plates of the tensioning plate stack 164 into an oblique orientation relative to the longitudinal axis of the metal rail 152 the plates grip with the metal rail 152 such the reminder of the stroke displaces the sliding cover 104 longitudinally along a portion of the length of the metal rail 152. Upon release of the tensioning handle 156 the plates of the tensioning plate stack 164 pivot through an orthogonal orientation to another oblique orientation relative to the metal rail 152 responsive to urging of a tensioning handle return spring seated in the tension plate stack chamber between the housing 154 and the tensioning plate stack 164. This locks the sliding cover 104 as displaced by the stroke of the tensioning handle 156. As will be appreciated by those of skill in the art, incremental strokes of the tensioning handle 156 displace the sliding cover 104 into engagement with the switchgear enclosure 12 (shown in FIG. 1), load the partition cover 100 (shown in FIG. 1), and ultimately fix within the switchgear enclosure 12.

With continuing reference to FIGS. 6 and 7, the release handle 158 is pivotably fixed to the housing 154 and is movable in through a release stroke 168. The release stroke 168 is substantially parallel to the sliding cover 104. The parallel disposition of the release stroke 168 in relation to the sliding cover 104 allows a user to release the compressive load carried by the partition cover 100 in a predictable and smooth manner, the weight of partition cover 100 transferring from the switchgear enclosure 12 in a transfer easily controlled by the user.

The release handle 158 is seated on the metal rail 152 and is in communication with a locking plate stack 166. The locking plate stack 166 is operably associated with the sliding cover 104 (shown in FIG. 3), the locking plate stack 166 arranged between the tensioning plate stack 164 and the second lip 112 (shown in FIG. 3) of the sliding cover 104. The locking plate stack 166 is similar to the tensioning plate stack 164 and is additionally arranged within a tensioning plate chamber defined within the housing 154 and is urged into normally oblique orientation by a locking plate stack upper spring and a locking plate stack lower spring.

The locking plate stack upper spring and the locking plate stack lower spring are each arranged between the housing 154 and the release handle 158 to cause the locking plate stack 166 to grip the metal rail 152 when spaced apart from the housing grip portion 160, and to release the metal rail 152 when the release handle is proximate the housing grip portion 160. As will be appreciated by those of skill in the art in view of the present disclosure, this causes the locking mechanism 106 to fix the sliding cover 104 in position subsequent to displacement by the above-described operation of the tensioning handle 156 to fix the partition cover in the switchgear enclosure 12 (shown in FIG. 1) with a compressive load generated by the displacement of the sliding cover 104. As will also be appreciated by those of skill in the art in view of the present disclosure, this also allows the release handle 158 to release the compressive load for purposes of removing the cover partition from the interior of the switchgear enclosure 12.

Figure 8:
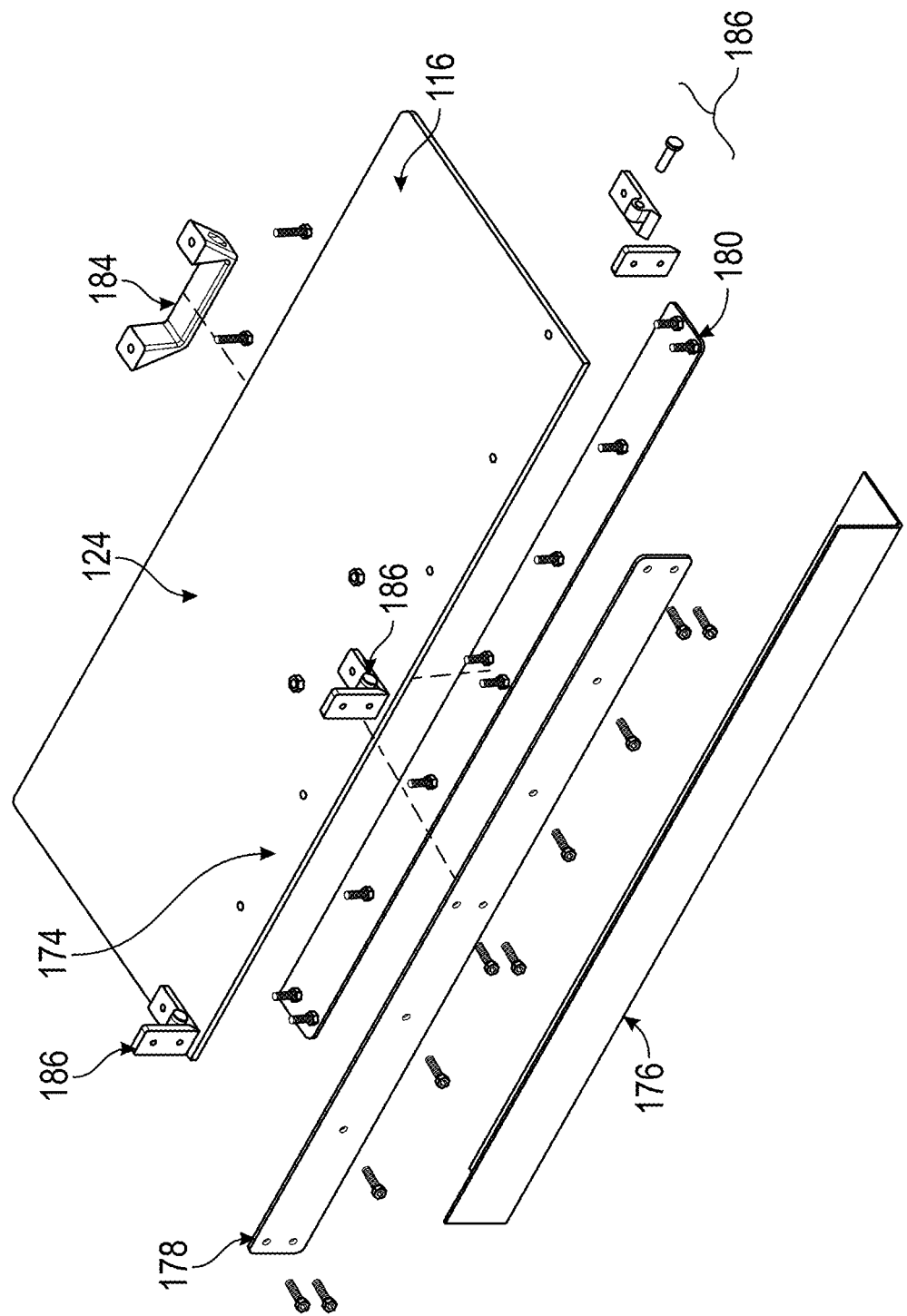
FIG. 8 is a partial exploded view of the lower baffle of the partition cover of FIG. 1 according to an embodiment, showing a resilient member and stopped hinges fixing the lower baffle to the main body of the partition cover.

Referring to FIG. 8, the optional lower baffle 116 is shown in an exploded view. When included, the lower baffle 116 includes a lower baffle body 174 that is pivotably fixed to a longitudinal edge 172 (shown in FIG. 4) of the main cover 102. Pivotably fixation of the lower baffle 116 to the longitudinal edge 172 of the main cover 102 allows the lower baffle 116 to move between the folded position 118 (shown in FIG. 3) and the deployed position 120 (shown in FIG. 3). The folded position 118 prevents the partition cover 100 (shown in FIG. 1) from becoming unwieldy during emplacement within the switchgear enclosure 12 (shown in FIG. 1) by retaining the center of gravity in proximity to the plane of the main cover 102 (shown in FIG. 3). The deployed position 120 allows the partition cover 100 to be emplaced within the switchgear enclosure 12 such that the lower baffle 116 extends into the bus cell 30 (shown in FIG. 1) and below the partition 18 (shown in FIG. 1), the supply bus 20, and the feeder bus 22 (shown in FIG. 22) by first dropping the lower baffle 116 and then displacing the partition cover 100 in the direction of the partition such that the lower baffle 116 slides beneath the partition. So emplaced the lower baffle 116 to provide isolation between the these structures, which may be energized, and structures requiring service in the lower recesses 44 (shown in FIG. 1) of the switchgear enclosure, as illustrated schematically in FIG. 2 with deployed position 120 shown in dotted line.

It is contemplated that the lower baffle body 174 have a planar body 122 with a generally rectangular shape. It is also contemplated that the lower baffle body 174 be formed from a transparent and electrically insulative material, e.g., the transparent and electrically insulative material 124. Transparency allows a user to align the partition cover 100 (shown in FIG. 1) to the partition 18 (shown in FIG. 1) visually as the partition 18 is visible through the lower baffle body 174 when in the folded position 118. More specifically, transparency allows a user to register two or more alignment marks 130 corresponding to feeder tube apertures of the feeder tube aperture array 28 and arranged on the main cover 102. Transparency also allows a user to visually inspect structures isolated by the partition cover 100, such as the feeder tubes and bus bars visible in the bus chamber when the shutter mechanism 34 is open. Electrical insulation affords separation between energized structures within the lower recesses 44 (shown in FIG. 1) of the bus cell 30 (shown in FIG. 1), limiting risk of electrocution during work on structures in and in the vicinity of the lower recesses 44.

As shown in FIG. 8, a resilient member 176, an aperture-facing retainer 178, and a partition-facing retainer 180 cooperate to couple the lower baffle 116 to the main cover 102 (shown in FIG. 3). The resilient member 176, which is formed from an opaque and electrically resistive material 182, couples the lower baffle 116 to the main cover 102. The aperture-facing retainer 178 overlaps the resilient member 176 and the main cover 102, and is affixed thereto be fasteners. The partition-facing retainer 180 overlaps the resilient member 176 and the lower baffle 116, and is affixed thereto with fasteners. In certain embodiments the fasteners are formed from an electrically insulative material, e.g., nylon nuts, bolts, washers, etc., thereby providing isolation.

As also shown in FIG. 8, a lower baffle handle 184 is fixed to the lower baffle 116. The lower baffle handle 184 is disposed on a side of the main cover 102 (shown in FIG. 3) opposite the first lip 108 (shown in FIG. 3) in both the folded position 118 (shown in FIG. 3) and the deployed position 120 (shown in FIG. 3). This placement allows a user to move the lower baffle 116 between the folded position 118 and the deployed position 120 with the partition cover 100 (shown in FIG. 1) with one hand while retaining the cover partition in a vertical orientation with the other hand. In certain embodiments one or more of the stopped hinges 186 couple the lower baffle 116 to the main cover 102, the stopped hinges 186 limiting the movement range of the lower baffle 116 to within a predetermined range relative to the main cover 102 (shown in FIG. 3). In accordance with certain embodiments, the predetermined range is 90-degrees or less relative to the longitudinal lower edge of the main cover 102, as appropriate for the arrangement of the switchgear enclosure 12 (shown in FIG. 1).

Figure 9A:
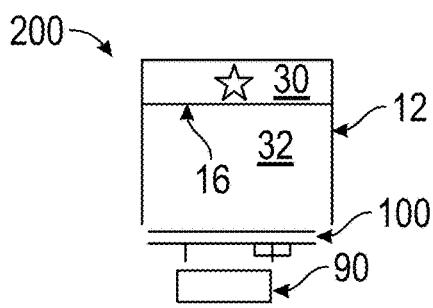
FIGS. 9A-E schematically show a method of emplacing a partition cover within a switchgear enclosure according to an embodiment, showing steps of the method.

With reference to FIGS. 9A-9E, a method 200 of emplacing a partition cover within a switchgear enclosure is shown. As shown in FIG. 9A, the circuit breaker, e.g., the circuit breaker 14 (shown in FIG. 1) is racked-out and thereafter removed from the switchgear enclosure in preparation for the emplacement of the partition cover 100. The partition cover 100 is manipulated by a user 90 such that the partition cover 100 is substantially parallel to the partition 18 of the switchgear enclosure 12.

Figure 9B:
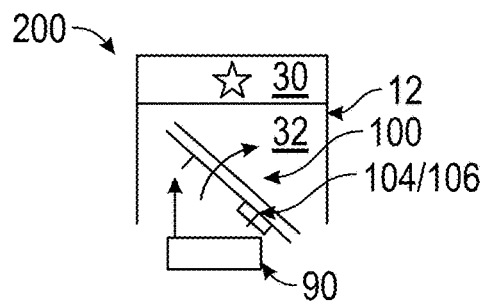
Figure 9C:
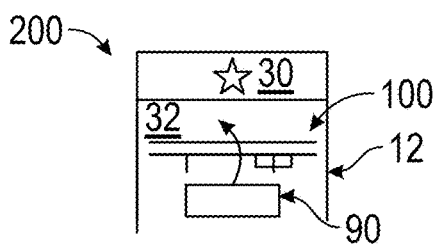

As shown in FIG. 9B, the partition cover is then advanced partially into the switchgear enclosure 12 by the user 90 and rotated by the user about 45-degrees relative to vertical within the switchgear enclosure 12. The rotation is such that the locking mechanism 106 and sliding cover 104 are spaced apart from the partition 18 by a greater distance than the first lip 108 (shown in FIG. 3) from the partition. Then, without substantially advancing the partition cover 100 further into the switchgear enclosure 12, the partition cover 100 is rotated by about 45-degrees in the opposite direction about the vertical axis, as shown in FIG. 9C. Rotation of the partition cover 100 places the partition cover 100 in an orientation that is substantially parallel to the partition 18.

Figure 9D:
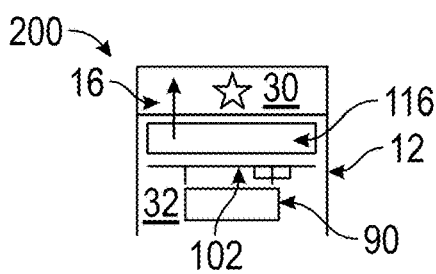
Figure 9E:
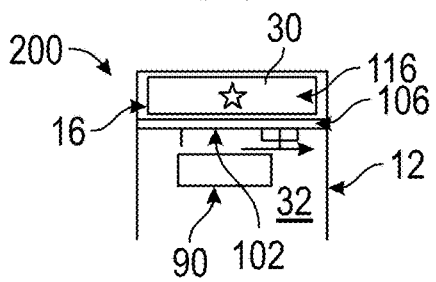
Figure 10E:
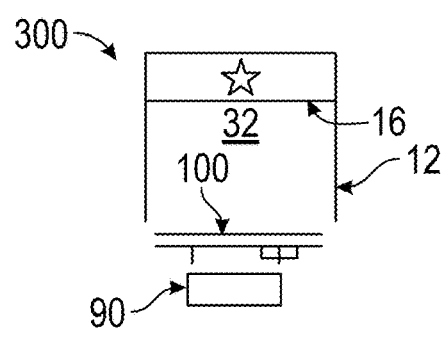

As shown in FIG. 9D, the user 90 then moves the lower baffle 116 from the folded position 118 (shown in FIG. 3) to the deployed position 120 (shown in FIG. 3) such that the main body 102 of the partition cover 100 overlaps the lower baffle 116. The partition cover 100 is then advanced into the switchgear enclosure 12 such that the main cover 102 of the partition cover 100 approaches (and in certain embodiments abuts) the partition 18, as shown in FIG. 9E. This places the lower baffle 116 below the bus cell 30, the lower baffle 116 thereby providing isolation between energized components (shown with the asterisk in FIGS. 9A-9E) located within the bus cell 30 and structures located in the lower recesses 44 of the switchgear enclosure 12.

As shown in FIG. 9E, the user 90 next displaces the sliding cover 104 longitudinally relative to the main cover 102 from a first position I (shown in FIG. 9D) to a second position II. In the second position the sliding cover 104 the first lip 108 (shown in FIG. 3) and the second lip 112 (shown in FIG. 3) of the partition cover 100 compressively seat within the interior of the switchgear enclosure 12, the partition cover 100 thereby being fixed within the switchgear enclosure 12. Lateral displacement is accomplished using the locking mechanism 106 (shown in FIG. 3) by actuating the tensioning handle 156 (shown in FIG. 6). As will be appreciated, displacement of the sliding cover 104 compresses both the first compression member 188 (shown in FIG. 3) and the second compression member 190 (shown in FIG. 3) against the interior of the switchgear enclosure 12.

Figure 10A:
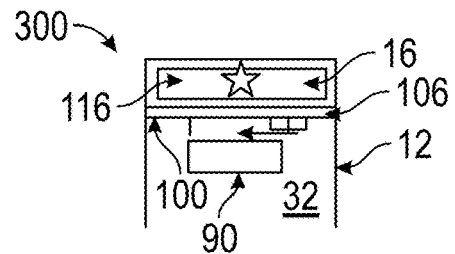
FIGS. 10A-E schematically show a method of removing the partition cover from within the switchgear enclosure according to the embodiment, showing steps of the method.
Figure 10B:
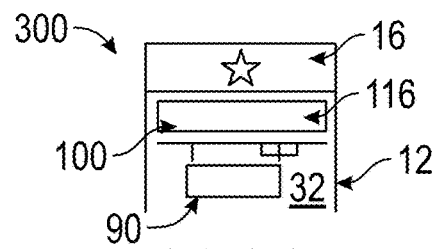
Figure 10C:
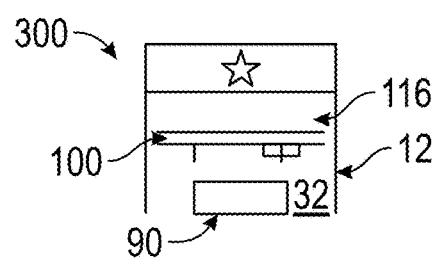
Figure 10D:
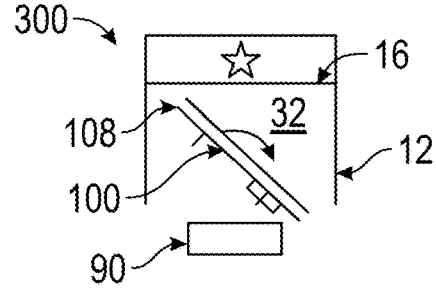

With reference to FIGS. 10A-10E, a method 300 of removing the partition cover 100 from the switchgear enclosure 12 is shown. As shown in FIG. 10A, the locking mechanism 106 is released by the user 90. This releases the compressive load fixing the partition cover 100 within the switchgear enclosure 12. As shown in FIG. 10B, the partition cover 100 is then retracted from the switchgear enclosure 12 such that the lower baffle 116 is disposed within the breaker cell 32. The lower baffle 116 is then moved from the deployed position 120 (shown in FIG. 3) to the folded position 118 (shown in FIG. 3), as shown in FIG. 10C. The partition cover 100 is thereafter rotated about 45-degrees about the vertical axis such that the first lip 108 (shown in FIG. 3) is proximate the partition 18, as shown in FIG. 10D. The partition cover 100 is then withdrawn from the switchgear enclosure 12 such that the circuit breaker 14 can be racked-in, and the switchgear assembly 10 returned to service.

Barrier devices typically employed during switchgear enclosure maintenance events are generally serve only partial purpose and allow the switchgear enclosure to expose a user to risk. Will the enclosure shutters may be cycled and certain switchgear enclosure structures be accessible inspection, users are typically unable to enter the switchgear enclosure due to risk posed by energized structures within the switchgear enclosure. For that reason switchgear enclosure maintenance events generally require that power be removed from the switchgear enclosure, typically with a scheduled bus section outage.

In embodiments described herein partition covers are provided that fully separate the energized structures in switchgear enclosures from the remainder of the enclosure, allowing users to enter the enclosure to inspect and/or service switchgear enclosure structures without risk of contacting such structures. In certain embodiments partition covers described herein allow users to enter switchgear enclosures while energized with little (if any) risk of contacting energized structures. It is contemplated that the partition covers described herein be adjustable, allowing the partition cover to be manipulated to accommodate switchgear architecture from more than switchgear enclosure manufacturer.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A partition cover for use with electrical distribution equipment enclosures having an interior area, the interior having a service aperture, comprising:
   a main cover with a first lip arranged along a first edge of the partition cover, the main cover being made from an electrically nonconductive material;
   a sliding cover with a second lip arranged along a second edge of the partition cover, the sliding cover slidably supported on the main cover, the sliding cover being made from an electrically nonconductive material; and
   a locking mechanism fixed to the sliding cover and operably associated with the sliding cover, wherein the locking mechanism is arranged to lock position of the sliding cover relative to the main cover to fix the partition cover within the interior of the enclosure;
   wherein the main cover is selectively movable within the interior area.

2. The partition cover as recited in claim 1, further comprising:
   a first handle fixed to the main cover adjacent to the first lip; and
   a second handle fixed to the main cover and longitudinally offset from the first handle, the first handle being arranged longitudinally between the second handle and the first lip.

3. The partition cover as recited in claim 1, further comprising:
   a first guide fixed to the main cover and longitudinally offset from the first lip;
   a second guide fixed the main cover and laterally offset from the first guide, wherein the sliding cover slidably receives both the first guide and the second guide to limit movement of the sliding cover to a plane substantially parallel with the main cover.

4. The partition cover as recited in claim 1, wherein the partition cover and the sliding cover include a transparent and an electrically nonconductive material.

5. The partition cover as recited in claim 1, wherein the sliding cover defines:
   a first guide slot extending through the sliding cover and substantially orthogonal to the second lip to receive a first guide fixed to the main cover; and
   a second guide slot extending through the sliding cover and substantially parallel to the first guide slot to receive a second guide fixed to the main cover.

6. A partition cover for use with electrical distribution equipment enclosures, comprising:
   a main cover with a first lip arranged along a first edge of the partition cover;
   a sliding cover with a second lip arranged along a second edge of the partition cover, the sliding cover slidably supported on the main cover; and
   a locking mechanism fixed to the sliding cover and operably associated with the sliding cover, wherein the locking mechanism is arranged to lock position of the sliding cover relative to the main cover to fix the partition cover within an interior of electrical distribution equipment enclosures;
   wherein the main cover comprises an alignment mark corresponding to a feeder tube aperture array of a partition of the electrical distribution equipment enclosure.

7. A partition covers for use with electrical distribution equipment enclosures, comprising:
   a main cover with a first lip arranged along a first edge of the partition cover;
   a sliding cover with a second lip arranged along a second edge of the partition cover, the sliding cover slidably supported on the main cover; and
   a locking mechanism fixed to the sliding cover and operably associated with the sliding cover, wherein the locking mechanism is arranged to lock position of the sliding cover relative to the main cover to fix the partition cover within an interior of electrical distribution equipment enclosures;
   wherein the locking mechanism comprises a metal rail fixed relative to the main cover and overlapping the sliding cover.

8. The partition cover as recited in claim 7, wherein the locking mechanism further comprises:
   a housing fixed to the sliding cover and having a grip portion extending therefrom, the housing arranged between the metal rail and the sliding cover;
   a tensioning handle pivotably fixed to the housing and movable in a tensioning stroke substantially parallel to the sliding cover; and
   a release handle pivotably fixed to the grip and movable in a release stroke substantially parallel to the sliding cover.

9. The partition cover as recited in claim 7, wherein the locking mechanism further comprises:
   a tensioning plate stack seated on the metal rail and operably associated with the sliding cover; and
   a locking plate stack seated on the metal rail and operably associated with the sliding cover, the locking plate stack arranged between the second lip and the tensioning plate stack.

10. A partition covers for use with electrical distribution equipment enclosures, comprising:
    a main cover with a first lip arranged along a first edge of the partition cover;
    a sliding cover with a second lip arranged along a second edge of the partition cover, the sliding cover slidably supported on the main cover;
    a locking mechanism fixed to the sliding cover and operably associated with the sliding cover, wherein the locking mechanism is arranged to lock position of the sliding cover relative to the main cover to fix the partition cover within an interior of electrical distribution equipment enclosures; and
    a lower baffle pivotably fixed to a longitudinal edge of the main cover, the lower baffle movable between a folded position, wherein the lower baffle is substantially parallel relative to the main cover, and a deployed position, wherein the lower baffle is substantially orthogonal relative to the main cover.

11. The partition cover as recited in claim 10, further comprising:

a resilient member coupling the lower baffle to the main cover;

an aperture-facing retainer overlapping the resilient member and the main cover; and a partition-facing retainer overlapping the resilient member and the lower baffle, wherein the lower baffle is formed from a transparent and an electrically nonconductive material, wherein the resilient member is formed from an opaque and the electrically nonconductive material.

12. The partition cover as recited in claim 10, further comprising a lower baffle handle fixed to the lower baffle, the lower baffle handle disposed on a side of the main cover opposite the first lip when the lower baffle in a folded position.

13. A partition covers for use with electrical distribution equipment enclosures, comprising:

an enclosure with an interior;

a partition defining a feeder tube aperture array and separating the interior of the enclosure into a breaker cell and a bus cell;

a supply bus arranged within the bus cell and in communication with a first of feeder tube apertures;

a feeder bus arranged within the bus cell and in communication with a second of the feeder tube apertures; and a partition cover within the enclosure, wherein the partition cover is disposed within the breaker cell and separates the breaker cell from the supply bus and the feeder bus, wherein the partition cover includes:

a main cover with a first lip arranged along a first edge of the partition cover;

a sliding cover with a second lip arranged along a second edge of the partition cover, the sliding cover slidably supported on the main cover;

a locking mechanism fixed to the sliding cover and operably associated with the sliding cover, wherein the locking mechanism is arranged to lock position of the sliding cover relative to the main cover to fix the partition cover within the interior of the enclosure.

14. The partition covers for use with electrical distribution equipment enclosures as recited in claim 13, further comprising a shutter mechanism arranged within the bus cell for separating the breaker cell from the supply bus and the feeder bus.

15. The partition covers for use with electrical distribution equipment enclosures as recited in claim 13, further comprising:

a first handle fixed to the main cover at a location;

a second handle fixed to the main cover and longitudinally offset from the first handle such that the first handle is between second handle and the first lip;

a first guide fixed to the main cover and offset from the second handle; and a second guide fixed the main cover and offset from the second handle on a side of the main cover opposite the first guide, wherein the sliding cover slidably receives both the first guide and the second guide to limit movement of the sliding cover to a sliding cover movement plane substantially parallel with the main cover.

16. The partition covers for use with electrical distribution equipment enclosures as recited in claim 13, wherein the locking mechanism comprises a metal rail fixed to the main cover and overlapping the sliding cover, and further comprising a lower baffle pivotably fixed to a longitudinal edge of the main cover, the lower baffle movable between a folded position, wherein the lower baffle is substantially parallel relative to the main cover, and a deployed position, wherein the lower baffle is substantially orthogonal relative to the main cover.

17. The partition covers for use with electrical distribution equipment enclosures as recited in claim 13, wherein the partition cover and the sliding cover comprise a transparent and an electrically nonconductive material, wherein the main cover comprises an alignment mark corresponding to the feeder tube aperture array.

18. A method of emplacing a partition cover in an electrical distribution equipment enclosure, the enclosure having an interior area with a service aperture, the method comprising:

moving a main cover of the partition cover within the interior area in a direction away from the service aperture;

seating the main cover such that the main cover abuts a partition such that a first lip arranged along a first edge of the partition cover engages a side surface within the interior area, the main cover being made from an electrically nonconductive material;

displacing a sliding cover supported on the main cover relative to the main cover, the sliding cover having a second lip arranged along a second edge of the partition cover the sliding cover being made from an electrically nonconductive material; and locking the sliding cover relative to the main cover with a locking mechanism fixed to the main cover and operably connected to the sliding cover, whereby a position of the sliding cover is locked relative to the main cover.

19. A method of emplacing partition covers in electrical distribution equipment enclosures, comprising:

seating a main cover of the partition cover abuts a partition such that a first lip arranged along a first edge of the partition cover engages the enclosure;

displacing a sliding cover supported on the main cover relative to the main cover, the sliding cover having a second lip arranged along a second edge of the partition cover;

locking the sliding cover relative to the main cover with a locking mechanism fixed to the main cover and operably connected to the sliding cover, whereby a position of the sliding cover is locked relative to the main cover; and aligning the partition cover to a feeder tube aperture array defined by the partition by registering two or more alignment marks corresponding to feeder tube apertures of the feeder tube aperture array and arranged on the main cover.

20. A method of emplacing partition covers in electrical distribution equipment enclosures, comprising:

seating a main cover of the partition cover abuts a partition such that a first lip arranged along a first edge of the partition cover engages the enclosure;

displacing a sliding cover supported on the main cover relative to the main cover, the sliding cover having a second lip arranged along a second edge of the partition cover;

locking the sliding cover relative to the main cover with a locking mechanism fixed to the main cover and operably connected to the sliding cover, whereby a position of the sliding cover is locked relative to the main cover; and pivoting a lower baffle pivotably fixed to a longitudinal edge of the main cover between a folded position, wherein the lower baffle is substantially parallel to the main cover, and a deployed position, wherein the lower baffle is substantially orthogonal relative to the main cover; and advancing the partition cover into the enclosure such that the partition overlaps the lower baffle and the lower baffle is disposed at least partially within a bus cell of electrical distribution equipment enclosures.

\* \* \* \* \*